UNITED STATES PATENT OFFICE.

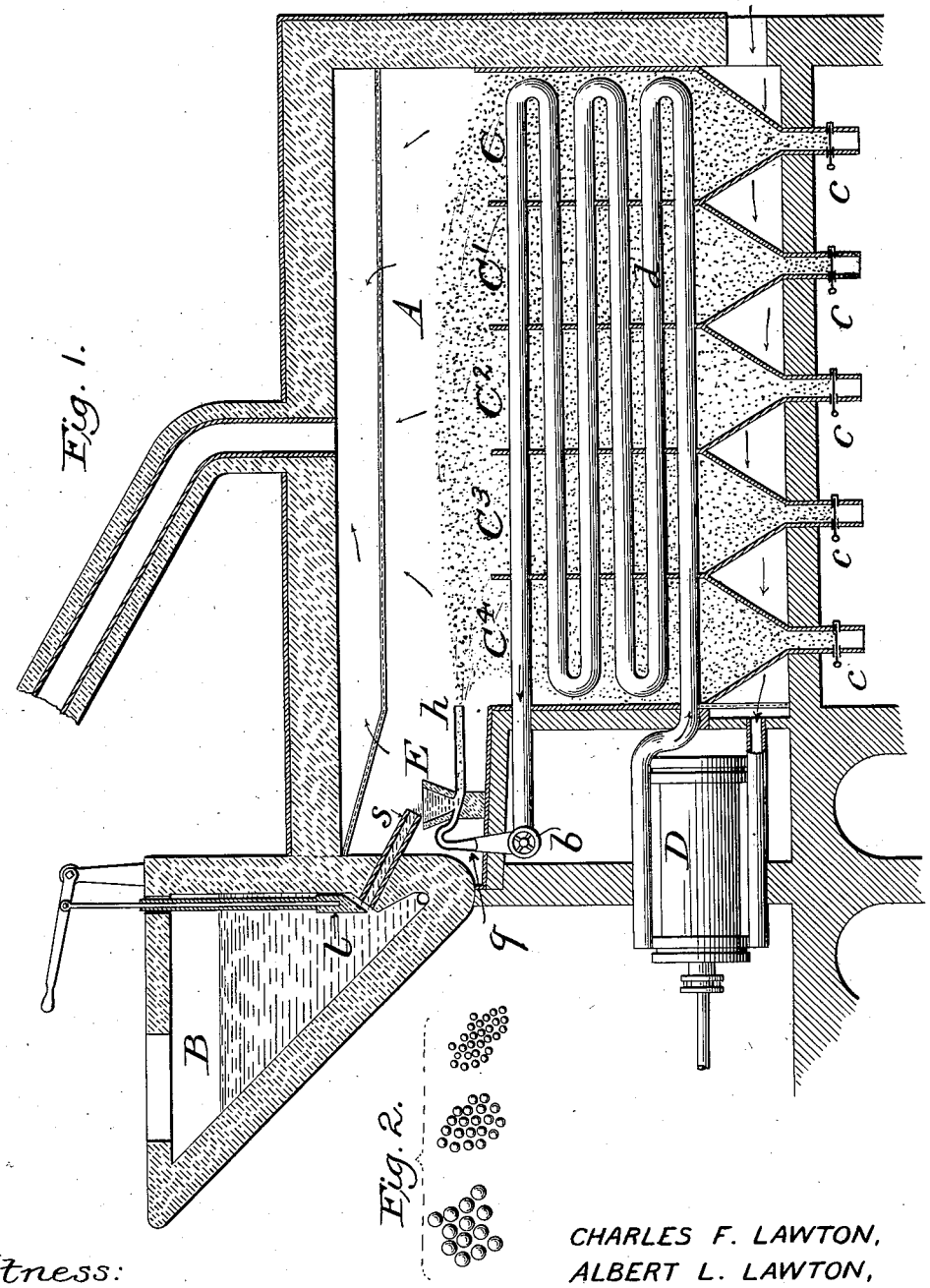

CHARLES F. LAWTON, ARTHUR W. LAWTON, AND ALBERT L. LAWTON, OF ROCHESTER, NEW YORK.

SALT.

SPECIFICATION forming part of Letters Patent No. 475,577, dated May 24, 1892.

Application filed March 29, 1892. Serial No. 426,900. (No specimens.)

*To all whom it may concern:*

Be it known that we, CHARLES F. LAWTON, ARTHUR W. LAWTON, and ALBERT L. LAWTON, citizens of the United States, residing at Rochester, in the county of Monroe and State of New York, have invented certain new and useful Improvements in Salt, of which the following is a specification.

Our invention relates to salt, designed for pickling meats and fish or for table use; and it consists in a novel form of the same, as hereinafter set forth and claimed.

In the drawings, Figure 1 is a sectional view of one form of apparatus for producing the salt herein described, and Fig. 2 a view representing the form of the salt.

It is a fact well known that salt as generally put upon the market, particularly table-salt, is hygroscopic—that is to say, it has the property of absorbing moisture from the air and caking in the salt-cellars or other receptacles, so as to materially interfere with its ready use at the table.

In applications serially numbered 380,783 and 416,827 we have described certain methods by means of which we are able to produce as a marketable article table-salt practically non-hygroscopic, the said methods consisting, substantially, in melting or fusing salt in the presence of a material of an alkaline nature.

In another application, Serial No. 387,259, we have shown and described an apparatus by means of which the salt produced under the aforesaid processes, or under any other processes in which it has ever been proposed to fuse or melt salt, may be transformed into globules or bodies of globular or spherical form, and it is to this product—salt in globular form—that the present invention relates.

In carrying out our invention we first reduce the salt by melting or fusing, and then run it into a receptacle B of the apparatus. (Shown in Fig. 1.) From this receptacle B, which is provided with a valve or gate $l$ and a spout $s$, the molten salt passes into an atomizer E, which, as shown in Fig. 1, is connected with a pump or air-forcing mechanism D by means of a pipe $d$ and reducing-pipe $q$. The pipes $d$ $q$ are provided with a valve $b$, by means of which the air or gas current may be regulated. The atomizer is provided with a discharge-pipe $h$, through which the salt is projected into the chamber A, which latter will advisably be divided into compartments C C' C$^2$ C$^3$ C$^4$, each of which is provided with a valve $c$. The melted or fused salt, which is forced through the atomizer and issues therefrom in globules of different sizes, will, upon a careful examination, be found to contain upon their outer surfaces a crust which appears to be harder than the main hollow body of the globule.

While we prefer to produce the salt in globular form by means of the apparatus shown, described, and claimed in the application (Serial No. 387,259) to which we have referred, we do not wish to be understood as limiting ourselves to the use of such apparatus or to the method of manufacturing and purifying salt set forth in the other applications above referred to. We contemplate, however, using said processes, as we are not aware of any fusion or melting processes other than these by means of which salt has ever been successfully produced.

By making the salt in the form herein shown and described the particles of a given body of salt roll over among one another and greatly facilitate its distribution from a salt-cellar or other receptacle, it being only necessary to tip the salt-cellar and not shake it, as has heretofore been required with salt made in the ordinary form.

In salting meat or fish salt in coarse pieces is generally preferred to fine salt, and for this purpose we make the salt in globules of larger size than when designed for table use.

No claim is made herein to the apparatus (Serial No. 387,259, filed April 1, 1891) shown for producing the described globular salt, nor to the methods (Serial No. 380,783, filed February 9, 1891, and Serial No. 416,827, filed January 2, 1892) referred to for the production of non-hygroscopic salt.

Having thus described our invention, what we claim is—

1. As an improved article of manufacture, salt in globular form.

2. As an improved article of manufacture, salt composed of hollow globular bodies.

CHARLES F. LAWTON.
ARTHUR W. LAWTON.
ALBERT L. LAWTON.

Witnesses to C. F. Lawton's signature:
JAMES O'TOOLE,
H. F. BOURDON.

Witnesses to A. W. Lawton's signature:
M. H. McMATH,
W. H. SHAW.

Witnesses to A. L. Lawton's signature:
F. G. FARDON,
Z. M. KNOTT.